US009532084B2

(12) United States Patent
Dhanabalan et al.

(10) Patent No.: US 9,532,084 B2
(45) Date of Patent: Dec. 27, 2016

(54) SWITCHING OF THE SOURCE FOR TELEVISION CONTENT

(71) Applicant: Verizon Patent and Licensing Inc., Arlington, VA (US)

(72) Inventors: Sankar Ram Dhanabalan, Irving, TX (US); Senthil K. Raghavan, Lewisville, TX (US); Prabhakar Mani, Coppell, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 41 days.

(21) Appl. No.: 14/274,336

(22) Filed: May 9, 2014

(65) Prior Publication Data

US 2015/0326920 A1 Nov. 12, 2015

(51) Int. Cl.
*H04N 21/234* (2011.01)
*H04N 21/2383* (2011.01)
*H04N 21/241* (2011.01)
*H04N 21/2665* (2011.01)
*H04N 21/426* (2011.01)
(Continued)

(52) U.S. Cl.
CPC ........ *H04N 21/234* (2013.01); *H04L 65/4076* (2013.01); *H04N 21/2383* (2013.01); *H04N 21/23406* (2013.01); *H04N 21/241* (2013.01); *H04N 21/2665* (2013.01); *H04N 21/426* (2013.01); *H04N 21/4263* (2013.01); *H04N 21/438* (2013.01); *H04N 21/4382* (2013.01); *H04N 21/4383* (2013.01); *H04N 21/44* (2013.01); *H04N 21/443* (2013.01); *H04N 21/44004* (2013.01); *H04N 21/4436* (2013.01);
(Continued)

(58) Field of Classification Search
CPC .................... H04N 21/4436; H04N 21/23406; H04N 21/2383; H04N 21/2665; H04N 21/4263; H04N 21/4382; H04N 21/4383; H04N 21/44004; H04N 21/64322; H04N 21/6587; H04L 65/4076; H04L 12/1804
USPC .......................................................... 725/99
See application file for complete search history.

(56) References Cited

U.S. PATENT DOCUMENTS

2005/0157215 A1* 7/2005 Minnick ............ H04N 21/4147
348/725
2008/0066139 A1* 3/2008 Tsai ........................ H04N 7/142
725/139

(Continued)

OTHER PUBLICATIONS

"Energy Star Program Requirements for Set-top Box Service Providers," Energy Star, Jun. 2012.

*Primary Examiner* — Nathan Flynn
*Assistant Examiner* — Caroline Somera

(57) ABSTRACT

A set-top box or media server device may operate to switch the source of incoming television content to, for example, improve power efficiency of the device. In one implementation, the device may receiving a television channel as part of a modulated television signal and extract, by a tuner associated with the device, the television channel from the modulated television signal. The device may determine to switch reception of the television channel from the modulated television signal to a packet-based video stream corresponding to the television channel. The device may provide the television channel, as received via the packet-based video stream, to the display device in place of the television channel received via the modulated television signal.

15 Claims, 9 Drawing Sheets

(51) Int. Cl.
*H04N 21/438* (2011.01)
*H04N 21/44* (2011.01)
*H04N 21/443* (2011.01)
*H04N 21/643* (2011.01)
*H04N 21/6587* (2011.01)
*H04L 29/06* (2006.01)

(52) U.S. Cl.
CPC ...... *H04N 21/643* (2013.01); *H04N 21/64322* (2013.01); *H04N 21/6587* (2013.01)

(56) References Cited

U.S. PATENT DOCUMENTS

| | | | | |
|---|---|---|---|---|
| 2010/0180291 | A1* | 7/2010 | Kahn | G06F 21/10 725/31 |
| 2013/0332949 | A1* | 12/2013 | Pyo | H04H 20/12 725/14 |
| 2014/0267927 | A1* | 9/2014 | MacLeod | H04N 5/63 348/730 |
| 2015/0052568 | A1* | 2/2015 | Glennon | H04N 21/482 725/100 |
| 2015/0089536 | A1* | 3/2015 | Byerley | H04N 21/25816 725/28 |

* cited by examiner

SWITCHING OF THE SOURCE FOR TELEVISION CONTENT

BACKGROUND

A television content provider may transmit television content to customer premises using, for example, a television signal transmitted over coaxial cable or fiber optic connections. The television signal may include a modulated signal that contains television content corresponding to a number of television channels. A set-top box (STB) or other device, at the customer premises, may receive the television signal and extract the particular television channel in which the customer is interested. For example, when directed to tune to a particular channel, the STB may decode the particular channel by: extracting the particular channel from the television signal (e.g., by demodulating the television signal), decoding the particular channel, and outputting the particular channel as a signal that is displayable by a television connected to the STB.

Some STBs may include the ability to pause the playback of a television channel. In response to a user selecting to pause a particular television channel, the STB may continue to decode the channel, but may save the decoded version of the television content in a buffer (e.g., a buffer implemented using a hard drive or other storage medium). When the user unpauses the television channel, the STB may read from the buffer to output a version of the television channel that is shifted in time (i.e., due to the pause) but that, from the perspective of the user, provides uninterrupted viewing of a television channel.

DETAILED DESCRIPTION OF PREFERRED EMBODIMENTS

The following detailed description refers to the accompanying drawings. The same reference numbers in different drawings may identify the same or similar elements.

Techniques described herein may operate to improve power efficiency of STB devices (or other devices used to provide television channels to users). A STB may include the ability to receive television content from at least two sources: (1) a modulated analog signal that carries content corresponding to a number of television channels, and (2) a packet-based video stream in which a particular television channel may be streamed over a packet-based connection. Tuning to a particular television channel, via the modulated analog signal, may require the use of tuner circuitry and/or may also result in the use of a hard disk drive (or other memory) to buffer the television channel and to thereby allow pausing and/or rewinding of the television channel. Use of the tuner and memory, however, may also result in nontrivial power usage.

In one implementation, the STB may automatically (from the user's perspective) switch between providing a particular television channel using the modulated analog signal or the packet-based video stream. When using the packet-based video stream, the STB may turn off or disable the tuner and the memory, potentially saving power. When the user pauses the television channel, or performs another action that requires buffering of the television channel, the STB may switch to using the tuner and the memory.

Figure 1A:
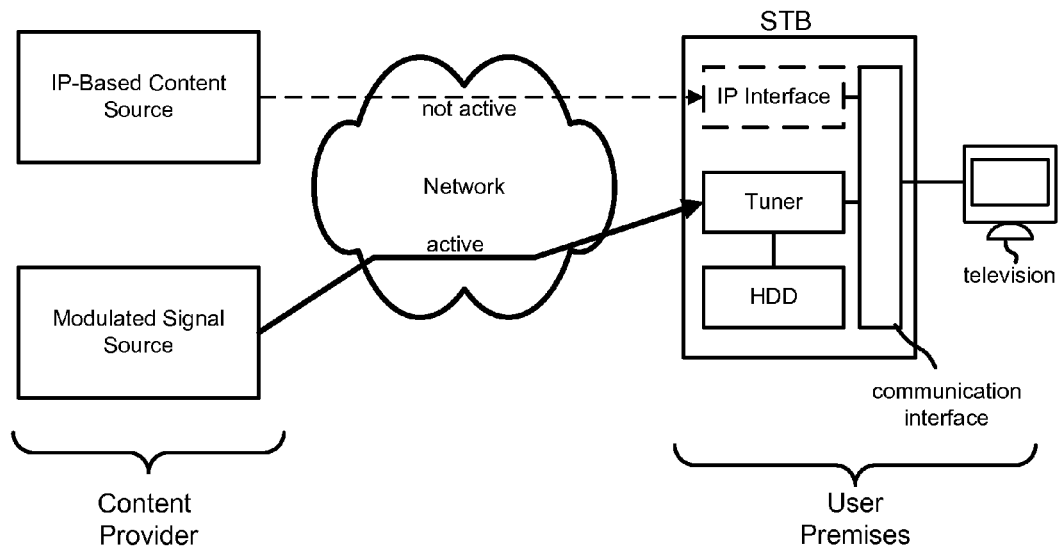
FIGS. 1A, 1B, and 1C are diagrams illustrating an example of an overview of concepts described herein.
Figure 1B:
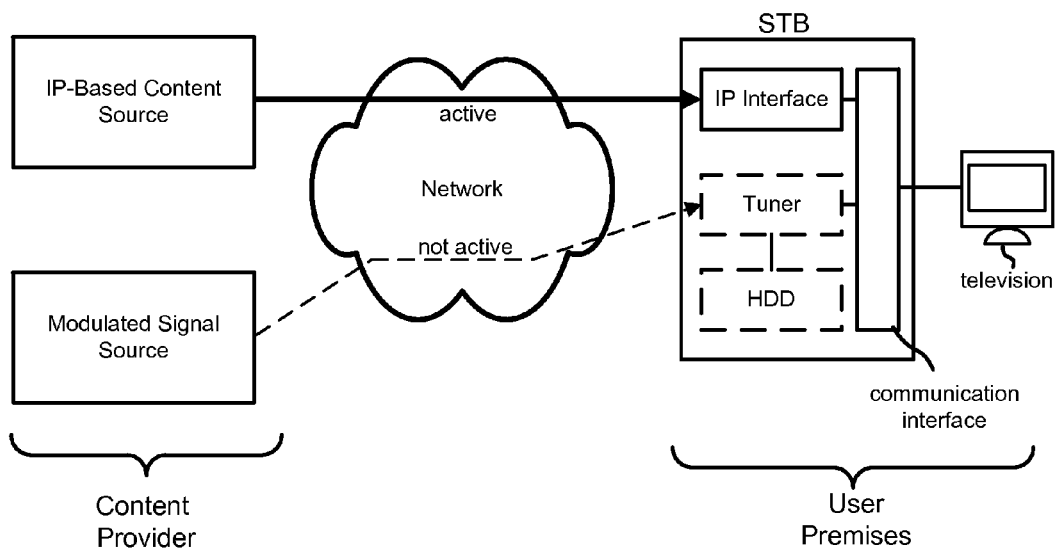
Figure 1C:
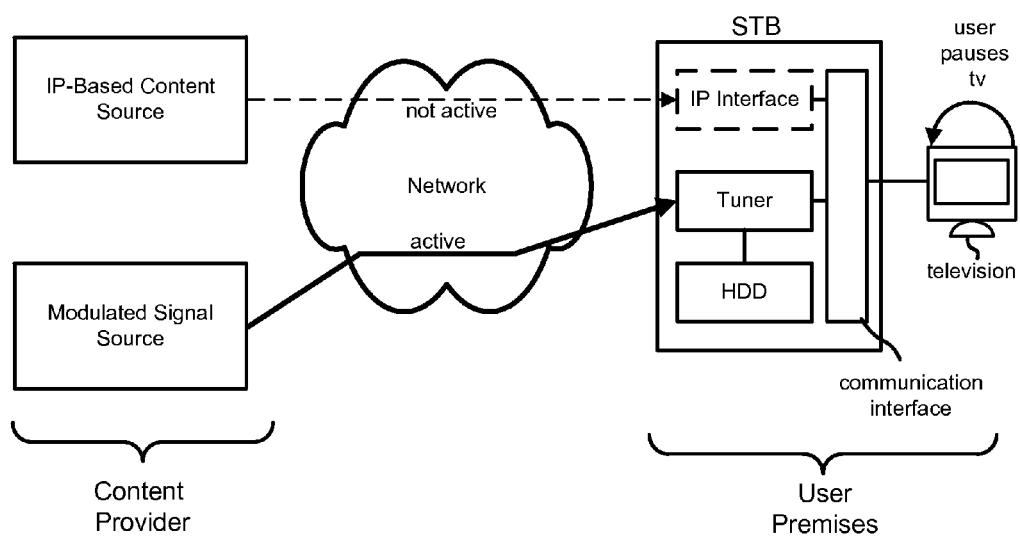

FIGS. 1A, 1B, and 1C are diagrams illustrating an example of an overview of concepts described herein. In FIGS. 1A, 1B, and 1C, a content provider (e.g., a television provider) may provide, through a network, television content using different possible content sources, illustrated as: a modulated signal source and an IP-based content source. The modulated signal source may include one or more devices that provide traditional cable television signals to users. The modulated television signal may be delivered via, for example, coaxial cables or fiber optic cables that lead up to the premises of the customers. The modulated television signal may be modulated using techniques such as quadrature amplitude modulation (QAM) or quadrature phase-shift keying (QPSK). The modulated television signal may include content associated with a number of television channels. The IP-based content source may provide the television channels, to the user premises, via an over the top (OTT) delivery techniques using IP-based packet streams.

In FIGS. 1A, 1B, and 1C, a single user premises is illustrated as receiving television content from the content provider. In practice, the content provider may be a telecommunications company that provides television services to numerous user premises. Each user premises may include one or more devices, such as a STB, to receive the television signal, delivered from the modulated signal source and/or the IP-based content source and provide a viewable television signal to user devices, such as a television. The STB may include a tuner (e.g., a QAM tuner) and a hard disk drive (HDD) to receive and buffer television signals from the modulated signal source. The STB may further include an IP interface to receive television signals from the IP-based content source. A communication interface (e.g., an HDMI interface) may provide an output television signal, from the modulated signal source or the IP interface, to the television.

As illustrated in FIG. 1A, assume that a user is initially watching a particular television channel. The STB may output the television channel, to the television, using the modulated signal source to obtain the television channel. The connection between the modulated signal source and the tuner, of the STB, is correspondingly indicated as "active" and the connection between the IP-based content source and the STB is correspondingly indicated as "not active."

The STB may determine that the television channel being viewed is available from the IP-based content source and that the user is not pausing the television channel or using other television services that require the tuner and/or the HDD. As illustrated in FIG. 1B, and based on this determination, the STB may begin to receive the television channel from the IP-based content source. The connection between the modulated signal source and the tuner, of the STB, is correspondingly indicated as "not active" and the connection between the IP-based content source and the STB is correspondingly indicated as "active." The tuner and/or the HDD may be placed into a low-power or off state to conserve electrical power used by the STB.

As illustrated in FIG. 1C, at some point, assume that a user chooses to pause playback of the television channel ("user pauses tv"). The STB may switch back to using the modulated signal source. The STB may thus again begin to buffer the television channel, making the television channel available to be paused by the user. The connection between the modulated signal source and the tuner, of the STB, is correspondingly again indicated as "active" and the connection between the IP-based content source and the STB is correspondingly indicated as "not active."

With the example illustrated in FIGS. 1A, 1B, and 1C, a STB can switch between different television content sources based on the actions of users. Electrical power can potentially be saved by using the IP-based content source when the IP-based content source is available and the user is viewing live television content.

Figure 2:
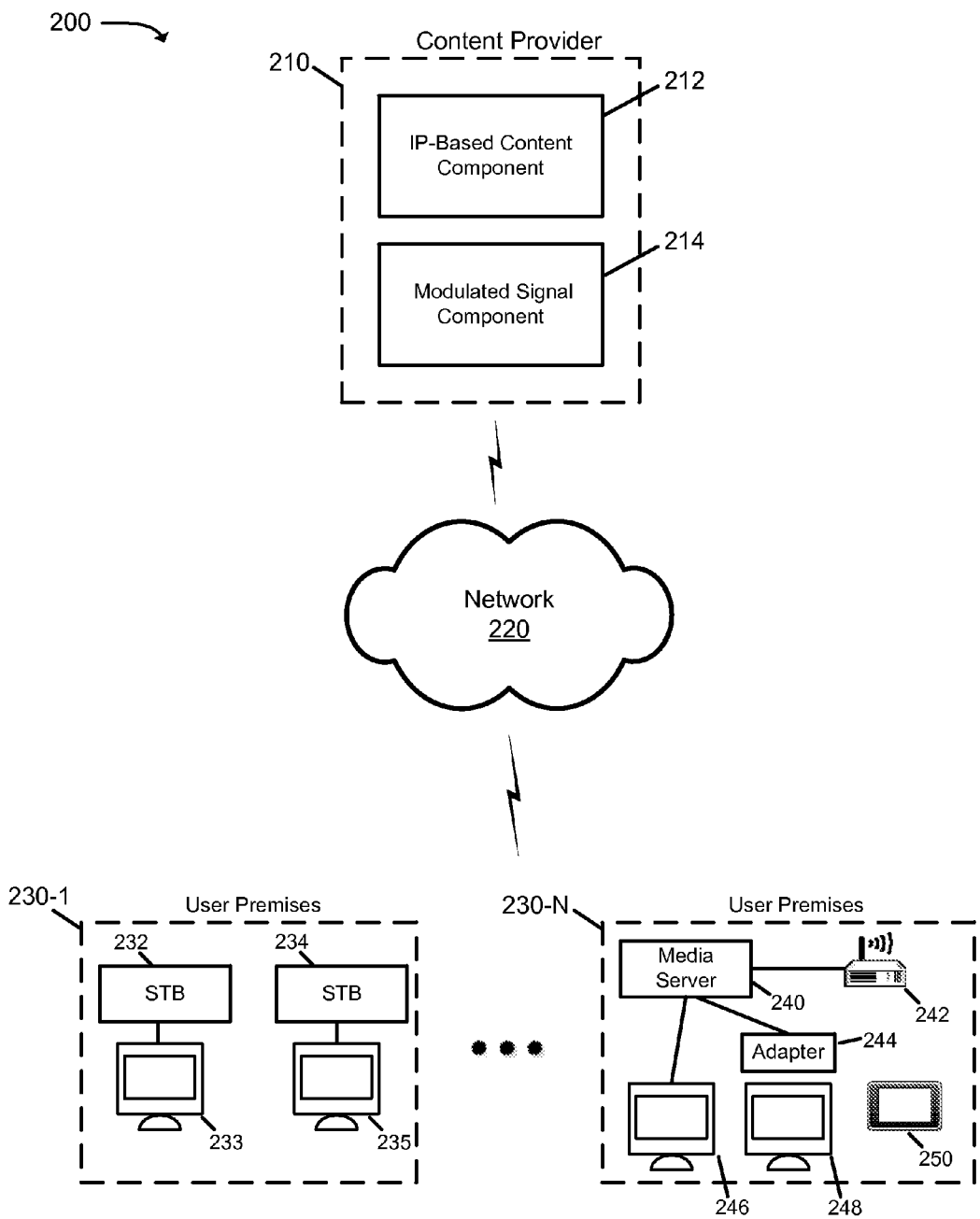
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include content provider 210, network 220, and user premises 230-1 through 230-N (where N is an integer greater than or equal to one, hereinafter sometimes referred to individually as "user premises 230" and collectively as "user premises 230"). Content provider 210 may represent any entity that provides content to user premises 230. Content provider 210 may include, for example, a telecommunications company, a cable television provider, a satellite television provider, or another entity that provides television content. As illustrated, content provider 210 may include IP-based content component 212 and modulated signal component 214. IP-based content component 212 and modulated signal component 214 are used herein to conceptually illustrate functionality associated with content provider 210 and do not necessarily represent individual devices.

IP-based content component 212 may include one or more devices to provide content to user premises 230 via packet-based video streams. IP-based content component 212 may include, for example, one or more content servers and/or related devices to perform authentication and/or authorization for the content servers. In one implementation, IP-based content component 212 may provide "live" (e.g. real-time or near real-time) packet streams corresponding to a number of television channels. Television channels may correspond to the television channels that content provider 210 may normally make available to television subscribers. In some implementations, the number of available television channels may correspond to a subset of the total set of television channels that are provided by content provider 210. In other words, not all of the television channels may be available as packet-based video streams.

In some implementations, IP-based content component 212 may provide the television channels as hyper-text transfer protocol (HTTP) live streaming (HLS) content. HLS is an HTTP-based media streaming communications protocol that breaks an overall stream into a sequence of HTTP-based file downloads, where each download may correspond to one chunk of an overall potentially unbounded transport stream. In some situations, the streaming client (e.g., a STB), may select from a number of different alternative streams containing the same material encoded at a variety of data rates, allowing the streaming session to adapt to the available data rate. IP-based content component 212 may provide the content as over-the-top (OTT) packet streams.

Modulated signal component 214 may include one or more devices to transmit television content to user premises 230. The television content may include television channels encoded using a modulation format such as QAM, QPSK, or another format. Modulated signal component 214 may transmit the modulated signal to STBs associated with user premises 230. The STBs may decode the modulated signal by using tuners to extract a particular television channel and provide the extracted television channel to a display device (e.g., a television).

Network 220 may include one or more wired and/or wireless networks. For example, network 220 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 220 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In one particular implementation, network 220 may be a network used to provide television content to user premises 230.

Each of user premises 230 may include one or more communication, computing, and/or content viewing devices. For example, user premises 230-1 is illustrated as including STBs 232 and 234, which may be connected to televisions 233 and 235, respectively. User premises 230-N is illustrated as including media server 240, WiFi router 242, media server adapter 244, televisions 246 and 248, and tablet 250. It can be appreciated that the number, type, and configuration of the devices illustrated as being associated with each of customer premises 230-1 and 230-N are examples.

STBs 232 and 234 may include one or more devices to receive television signals, decode the television signals, and provide the television signals to televisions 233 and 235, respectively. STBs 232 and 234 may include other capabilities, such as the ability to act as a digital video recorder, a media hub, a media server, etc. STBs 232 and 234 may, in response to a request from a user, provide an interactive television programming guide to the user.

Media server 240 include functionality similar to that provided by STBs 232 or 234. For example, media server may include one or more devices to receive television signals, decode the television signals, and provide the television signals to display devices, such as televisions 246 and 248. Media server 240 may be particularly designed to provide television services, and other services, to multiple display devices in user premises 230. For example, a single media server 240 may be installed at user premises 230-N. Media server 240 may include multiple tuners, such as QAM tuners, to decode and output television signals, through wired or wireless connections, to televisions or other display devices associated with user premises 230-N. For example, a television 246 may be directly connected to media server 240. Another television 248 may be connected to adapter 244, which may act as an interface between media server 240 and television 248. Adapter 244 may communicate, wirelessly or via wired connections, with media server 240. Adapter 244 may thus function as a relay (e.g., to provide a television signal output from media server 240 to television 248) device between media server 240 and television 248. In general, an adapter 244 may be a relatively inexpensive (compared to media server 240) device. Additional televisions may be added to a user premises 230, by installing additional adapters 244, without requiring the installation of additional media servers.

As further illustrated in FIG. 2, user premises 230-N may include a wireless router 242 and other display devices, such as tablet 250. Wireless router 242 may provide wireless (e.g., Wi-Fi) LAN capabilities for user premises 230-N. Wireless router 242 may connect to media server 240, or to another device, to obtain network connectivity (e.g., Internet connectivity) for user premises 230-N. Tablet 250 may include a tablet-type computing device that may connect, such as through wireless router 242, to media server 240. Tablet 250 may control media server 240 and obtain television channels from media server 240.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
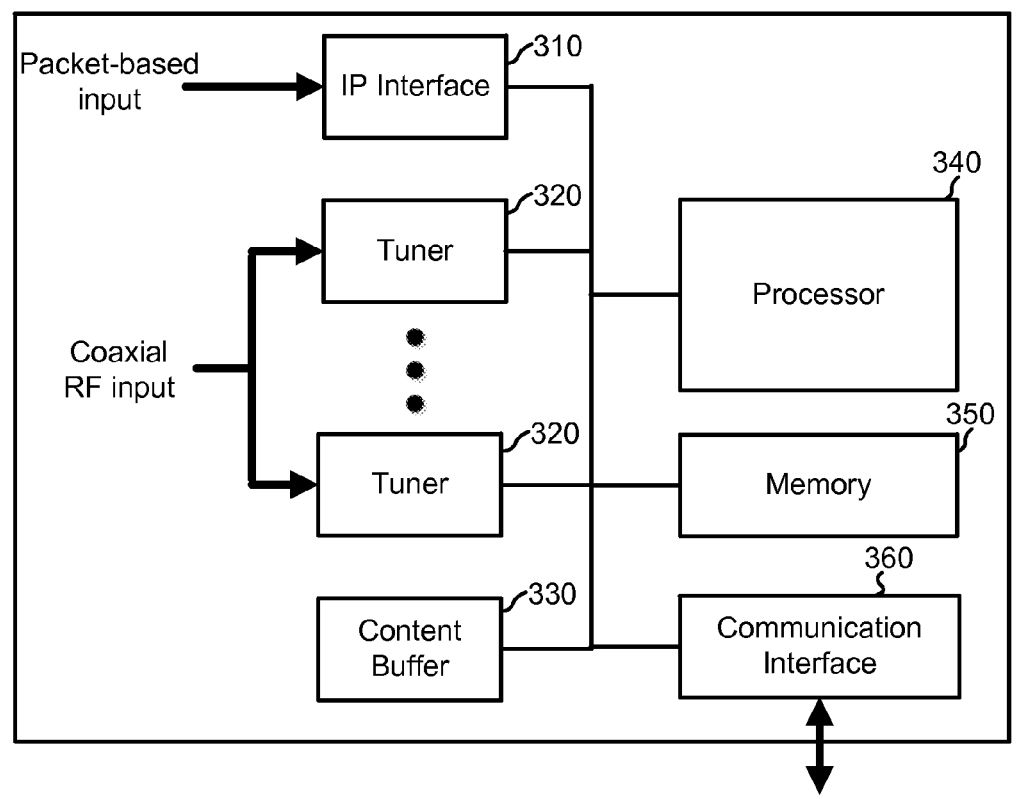
FIG. 3 is a diagram illustrating an example of functional components of a device corresponding to an implementation of a STB.

FIG. 3 is a diagram illustrating an example of functional components of a device 300 corresponding to an implementation of a STB (e.g., STB 232 or 234) or a media server (e.g., media server 240). As illustrated, device 300 may include IP interface 310, one or more tuners 320, content buffer 330, processor 340, memory 350, and communication interface 360.

IP interface 310 may include logic to enable network connectivity, such as an IP packet-based network connection, to IP-based content component 212. In some implementations, IP interface 310 may provide general network connectivity (e.g., Internet connectivity) to allow device 300 to connect to other devices/servers via network 220.

Each of tuners 320 may include logic to demodulate television signals that are received (e.g., over a fiber cable or coaxial cable) as modulated television signals from content provider 210. Device 300 may include one or multiple tuners 320. In implementations in which device 300 represents multiple tuners, the multiple tuners may simultaneously support multiple video streams (e.g., a user may simultaneously record and/or access multiple television channels). In one implementation, tuners 320 may each include QAM tuners to receive QAM modulated signals from content provider 210. In general, QAM modulation may be performed by changing the amplitude of two carrier waves using an amplitude-shift keying digital modulation scheme or an amplitude modulation analog modulation scheme. In another possible implementation, tuners 320 may include logic to demodulate signals that are received as QPSK modulated signals. In general, QPSK modulation may be performed by modulating the phase of a reference signal. In other possible implementations, the television signals may be received in a format other than as QAM/QPSK modulated signals.

Content buffer 330 may include memory, such as non-volatile memory, that is used to buffer or store television channels received by tuners 320. Content buffer 330 may enable device 300 to act as a digital video recorder. For example, whenever a tuner 320 is active, content buffer may be used to buffer a certain amount of data corresponding to television channels received via the active tuner. For example, content buffer 330 may be used to maintain a 30 minute window for received television channels, thereby allowing a user watching the received television channel to pause the television channel, or rewind the television channel, for up to 30 minutes into the past. Content buffers 330 may also store individual programs. For example, a user may indicate which programs the user is interested in recording for non-live playback. Content buffer 330 may be implemented as, for example, a hard disk drive, flash drive, or other storage technology.

Processor 340 may perform general control and processing functions for device 300. For example, for HLS streaming, processor 340 may be used to support HLS segmenting (i.e., segmenting a video stream into segments) and television channel changes. Processor 340 may additionally control the operation of tuners 320 and buffer 330 in receiving and buffering a television channel via a modulated television stream.

Memory 350 may include a dynamic or static storage device that stores information and/or instructions. In one implementation, instructions, for execution by processor 340, may be stored in memory 350 and read by processor 340 when needed. Device 300, or another device, may perform certain operations in response to processor 340 executing software instructions contained in a computer-readable medium, such as memory 350. A computer-readable medium may be defined as a non-transitory memory device. A memory device may include space within a single physical memory device or spread across multiple physical memory devices. The software instructions may be read into memory 350 from another computer-readable medium or from another device via IP interface 310 or communication interface 360. The software instructions contained in memory 350 may cause processor 340 to perform processes described herein. Alternatively, hardwired circuitry may be used in place of or in combination with software instructions to implement processes described herein. Thus, implementations described herein are not limited to any specific combination of hardware circuitry and software.

Communication interface 360 may include an interface, or interfaces, through which device 300 connects to external devices, such as STBs 232/234, televisions 233/235/246/248, adapter 244, wireless router 242, tablet 250, and/or other devices. In one implementation, communication interface 360 may include a wired Ethernet interface, a High-Definition Multimedia Interface (HDMI) interface, etc. Alternatively, or additionally, communication interface 360 may include a wireless transceiver to wirelessly connect to wireless router 242 and/or other devices, such as tablet 250.

Figure 4:
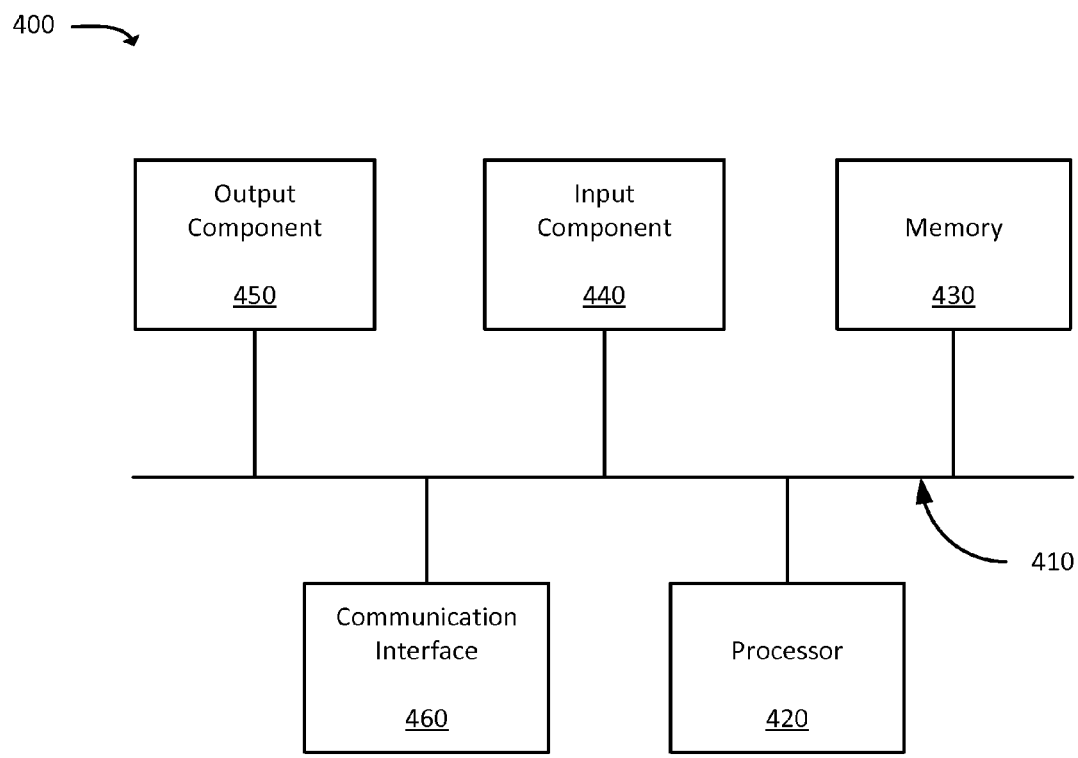
FIG. 4 is a diagram of example functional components of a device.

FIG. 4 is a diagram of example functional components of a device 400. Device 400 may correspond to, for example, a communication, computing, and/or content display device (e.g., other than STBs 232 and 234, and/or media server 240). For example, one or more of televisions 233/235/246/248, adapter 244, wireless router 242, tablet 250, IP-based content component 212, and/or modulated signal component 214, may include one or more devices 400. Device 400 may include bus 410, processor 420, memory 430, input component 440, output component 450, and communication interface 460. In another implementation, device 400 may include additional, fewer, different, or differently arranged components.

Bus 410 may include one or more communication paths that permit communication among the components of device 400. Processor 420 may include a processor, microprocessor, or processing logic that may interpret and execute instructions. Memory 430 may include any type of dynamic storage device that may store information and instructions for execution by processor 420, and/or any type of non-volatile storage device that may store information for use by processor 420.

Input component 440 may include a mechanism that permits an operator to input information to device 400, such as a keyboard, a keypad, a button, a switch, etc. Output component 450 may include a mechanism that outputs information to the operator, such as a display, a speaker, one or more light emitting diodes (LEDs), etc.

Communication interface 460 may include any transceiver-like mechanism that enables device 400 to communicate with other devices and/or systems. For example, communication interface 460 may include an Ethernet interface, an optical interface, a coaxial interface, or the like. Communication interface 460 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 400 may include more than one communication interface 460. For instance, device 400 may include an optical interface and an Ethernet interface.

Device 400 may perform certain operations relating to one or more processes described above. Device 400 may perform these operations in response to processor 420 executing software instructions stored in a computer-readable medium, such as memory 430.

Figure 5:
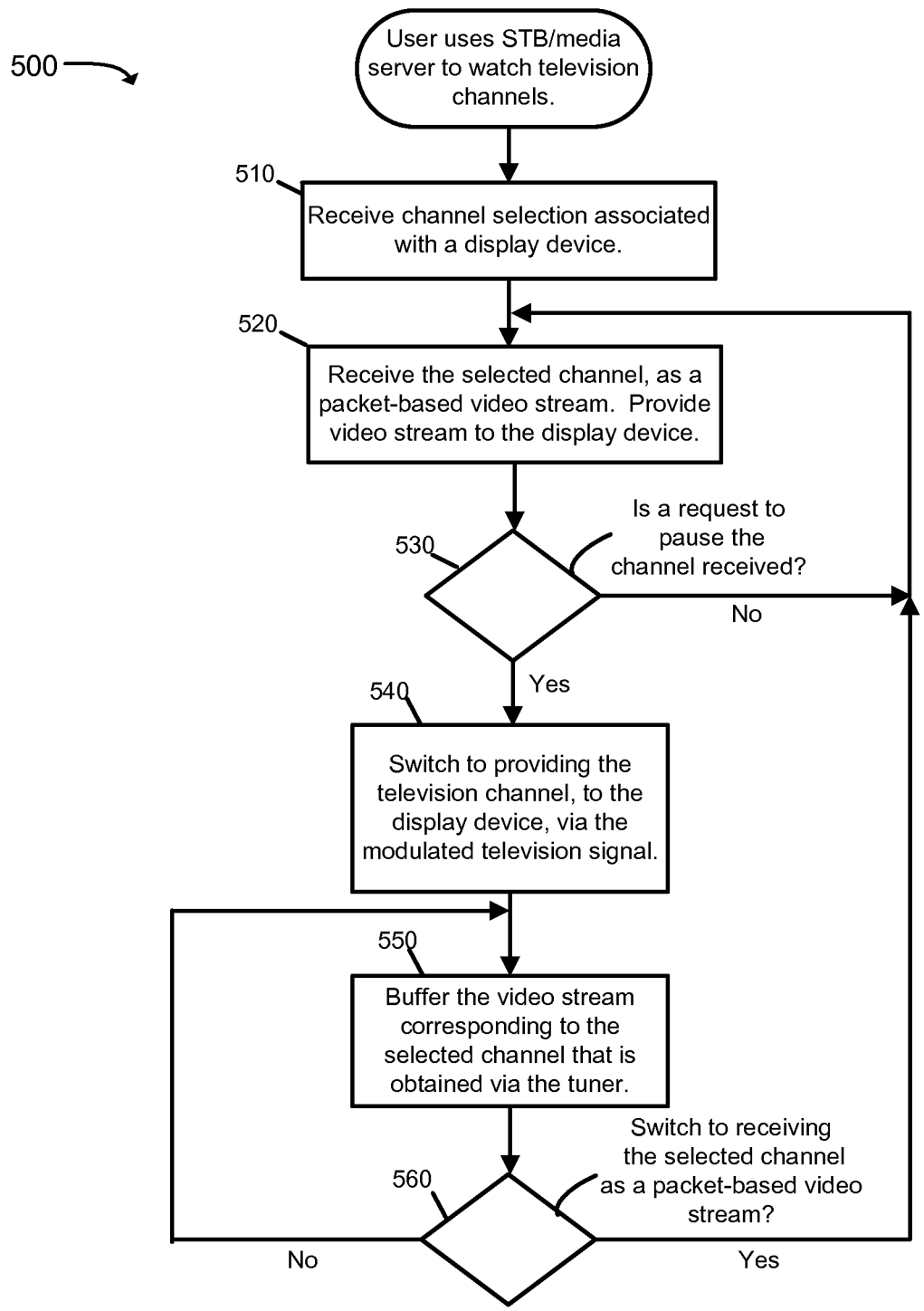
FIG. 5 is a flowchart illustrating an example process relating to the reception of television content from multiple sources.

FIG. 5 is a flowchart illustrating an example process 500 relating to the reception of television content from multiple sources. Process 500 may be performed by, for example, device 300 (e.g., STB 232/234 and/or media server 240).

Process 500 may be performed when a user uses device 300 to watch television channels through a display device, such as a television that is directly or indirectly connected to device 300 or at another device associated with user premises 230, such as tablet 250. Process 500 may include receiving a channel selection associated with the display device (block 510). For instance, device 300 may provide an interactive programming guide that presents a list of programs that are currently provided for a number of television channels. The user may input a selection that indicates a particular program that the user would like to watch.

Process 500 may further include receiving the selected channel as a packet-based video stream and providing the received video stream to the display device (block 520). For instance, IP interface 310 may request the packet-based video stream from IP-based content component 212. In one limitation, the video stream may be received as an HLS stream. The received HLS stream may be forwarded, through communication interface 360, to the display device. In some implementations, the HLS stream may be transcoded into a format suitable for the display device. For example, when the display device is a television connected to device 300 via a HDMI interface, device 300 may transcode the video signal into uncompressed video and audio data signals that are HDMI-compliant. When the display device includes another computing device, such as tablet 250, device 300 may forward the video stream in the HLS format, which may be further processed and displayed by tablet 250.

In some implementations, content provider 210 may only provide a subset of the available television channels as packet-based video streams. In this case, device 300, in response to receiving a channel selection, may initially determine whether the selected channel is available as a packet-based video stream. If the channel is not available, the television channel may be requested as a modulated television signal from modulated signal component 214.

Process 500 may further include determining whether a request to pause the television channel is received (block 530). For example, for a user viewing the television channel on a television, connected to device 300 and/or to adapter 244, the user may indicate, through a remote control, that the user would like to pause playback of the television channel.

When a pause request is received (block 530—Yes), process 500 may include switching to providing of the television channel, to the display device, via the modulated television signal (block 540). Switching to providing the television channel via the modulated television signal may include selecting one or more of tuners 320 (e.g., activating or powering-on tuners 320) and causing the selected tuner(s) to demodulate and/or decode the selected television channel. The video stream corresponding to the demodulated/decoded version of the selected television channel may be buffered (block 550). By buffering the live (i.e., the current stream of the television channel) video stream, the user can be provided with a paused version of the television channel. When the user unpauses the television channel, the video stream corresponding to a television channel may be read from content buffer 330 and provided to the user. From the user's perspective, content corresponding to the television channel may be received without discontinuities. If the user subsequently forwards through the buffered content or skips ahead to the live television channel, device 300 may discontinue reading from the buffer and may provide the video stream, to the display device, directly from the output of the selected tuner 320.

Process 500 may further include determining whether to switch back to receiving the selected channel as a packet-based video stream (block 560). In some implementations, device 300 may monitor the user's viewing of the selected television channel to determine whether it is appropriate to switch the source of the television channel back to the packet-based video stream. For example, after pausing the television channel, the user may fast forward the television channel back to the live television stream and continue to watch the live television stream for a particular period of time. At this point, it may be desirable to switch back to receiving the television channel via the packet-based video stream. Switching back to receiving the television channel via the packet-based video stream (block 560—Yes) may include returning to block 520. Otherwise, the television channel may continue to be received via the video stream corresponding to the modulated television signal (block 560—No, block 550).

Figure 6:
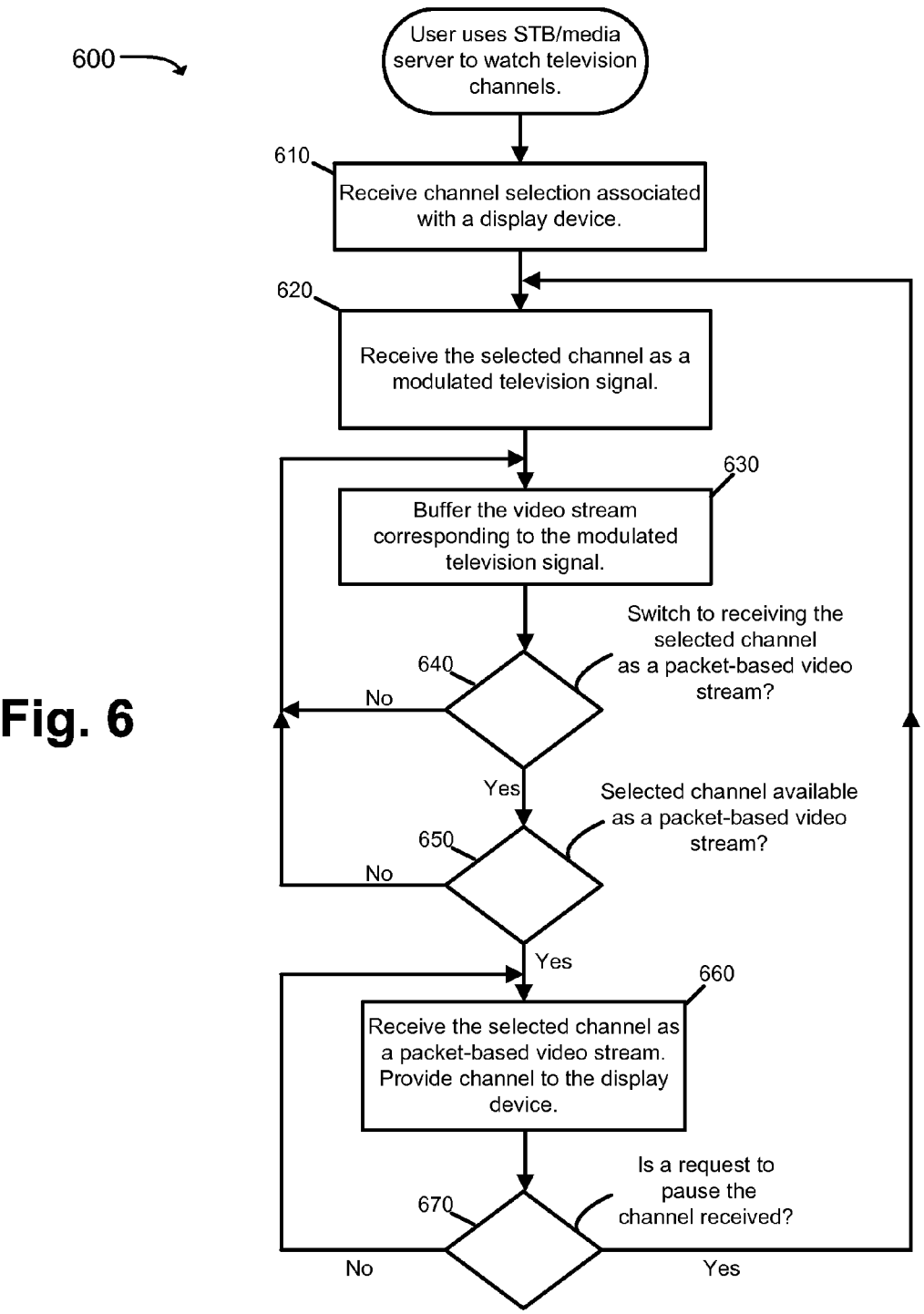
FIG. 6 is a flowchart illustrating an example process relating to the reception of television content from multiple sources.

FIG. 6 is a flow chart illustrating an example process 600 relating to the reception of television content from multiple sources. Process 600 may be performed by, for example, device 300. Process 600 may generally be similar to process 500. In process 600, however, a television channel that is selected by the user may be initially provided via tuners 320 instead of via IP interface 310.

Process 600 may include receiving a channel selection associated with a display device (block 610). Process 600 may further include receiving the selected channel as a modulated television signal (block 620). The modulated television signal may be provided to the display device as a video stream. For instance, device 300 may select one or more of tuners 320 and cause the selected tuner to demodulate and/or decode the selected television channel. The video stream corresponding to the modulated television signal may be buffered (block 630). The video stream may be buffered by storing the video stream in content buffer 330.

Process 600 may further include determining whether to switch to receiving the selected channel as a packet-based video stream (block 640). For example, device 300 may monitor the user's viewing of the selected television channel to determine whether it is appropriate to switch the source of a television channel back to a packet-based video stream. In one implementation, device 300 may determine to switch to receiving the selected channel as a packet-based video stream when a threshold period of time elapses (e.g., 19 seconds, five minutes, ten minutes, etc.) without the user performing an action that uses content buffer 330. An action that uses content buffer 330 may include pausing the television channel or recording a program for later viewing.

Process 600 may also include determining whether the selected channel is available as a packet-based video stream (block 650). As previously mentioned, in some implementations, not all television channels may be available as packet-based video streams.

When the selected television channel is available as a packet-based video stream and when it is determined to switch to receiving the selected channel as a packet-based video stream, process 600 may include receiving the selected channel as a packet stream and providing the corresponding video stream to the display device (block 650 and 640—Yes; block 660). As previously mentioned, in one implementation, the video stream may be received as an HLS stream. The received HLS stream may be forwarded to the display device. In some implementations, the HLS stream may be transcoded into a format suitable for the display device. By receiving the channel as a packet stream, device 300 may be able to turn off, suspend, or otherwise place tuners 320 and/or content buffer 330 into a low power state, potentially reducing the electrical power load of device 300. Alternatively or additionally, by using the packet-based video stream, device 300 may free tuners 320 to perform other tasks, such as to record a television program to content buffer 330.

In one implementation, the initial connection to IP-based content component 212, to receive the packet-based video stream may be performed while a tuner 320 is still operating.

Process 600 may further include determining whether a request to pause the television channel is received (block 670). When a request to pause the television channel is received, (block 670—Yes), process 600 may include switching to receiving the selected channel as a modulated television signal (block 620). Otherwise process 600 may include continuing to receive the selected channel as a packet-based video stream (block 670—No).

Figure 7:
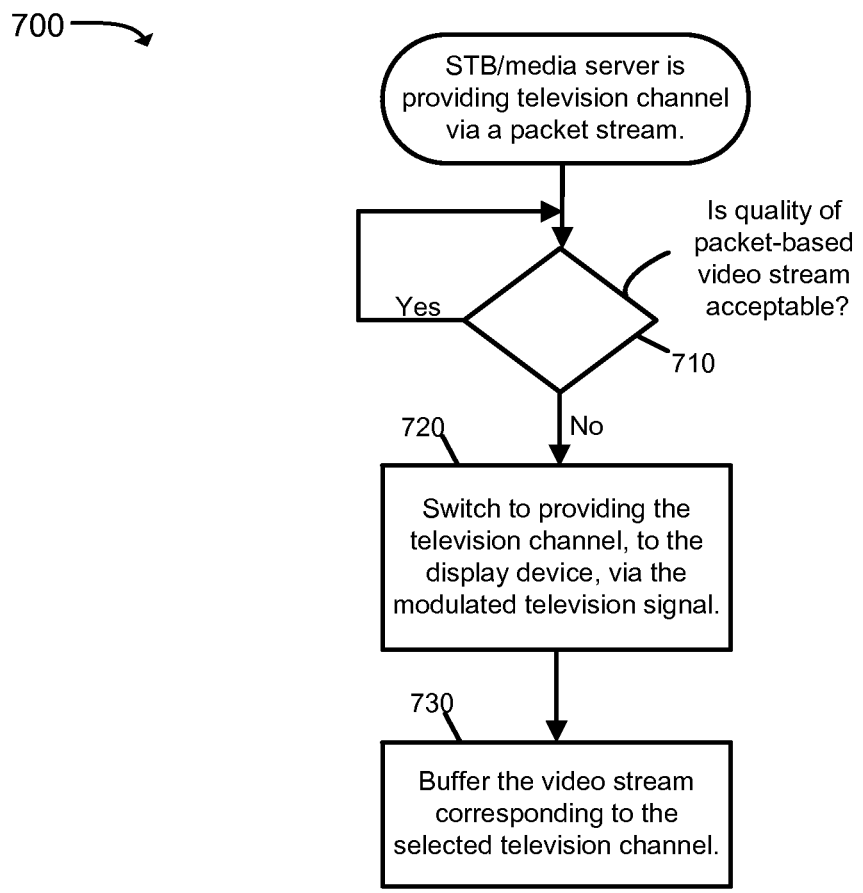
FIG. 7 is a flowchart illustrating an example process relating to switching between receiving a television channel based on the quality of the received signal.

FIG. 7 is a flow chart illustrating an example process 700 relating to switching between receiving a television channel based on the quality of the received signal. Process 700 may be performed by, for example, device 300.

Process 700 may begin when device 300 is receiving a television channel as a packet-based video stream. Process 700 may include determining whether the quality of the packet-based video stream is acceptable (block 710). Determining whether the quality of the packet-based video stream is acceptable may include, for example, comparing the received bit rate of the video stream to a threshold, comparing a number or portion of dropped packets related to the packet-based video stream to a threshold, or other techniques. In one implementation, IP interface 310 may output an indication of the quality of the received packet-based video stream.

When the quality of the packet-based video stream is determined to not be acceptable (block 710—No), process 700 may include switching to providing of the television channel, to the display device, via the modulated television signal (block 720). As previously mentioned, switching to providing the television channel via the modulated television signal may include selecting one or more of tuners 320 and causing the selected tuners to demodulate and/or decode the selected television channel. The video stream corresponding to the demodulated/decoded version of the selected television channel may be buffered (block 730). By buffering the live (i.e., the current stream of the television channel) video stream, the user can be provided with a paused version of the television channel.

Figure 8:
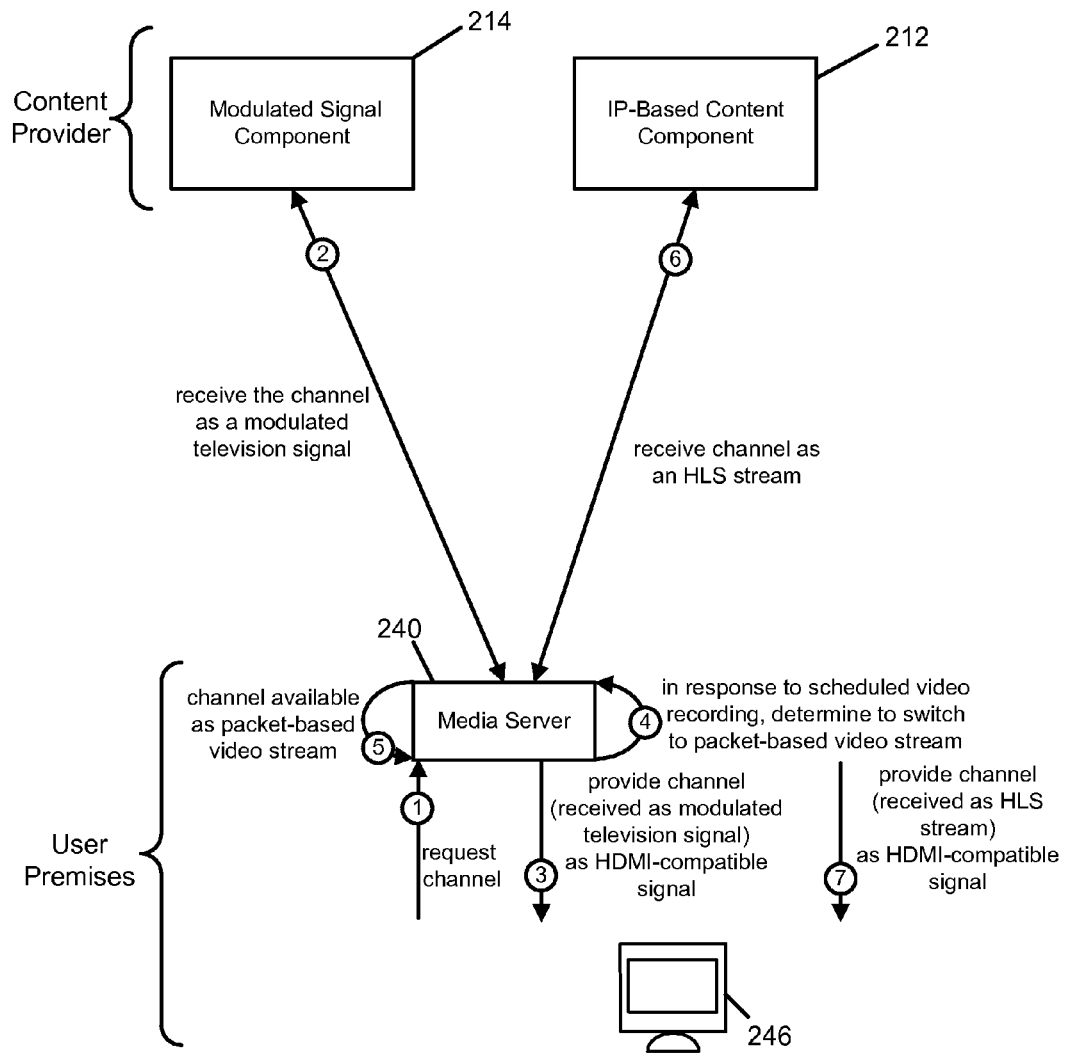
FIG. 8 is a diagram illustrating an example of switching of the source for television content.

FIG. 8 is a diagram illustrating an example of switching of the source for television content. In this example, the source signal for a television channel is switched from a modulated video stream to a packet-based video stream based on the desire to free a tuner (e.g., to record a television program) within a media server. As shown in FIG. 8, media server 240 may provide television channels to television 246. Media server 240 may receive signals for the television channels from a content provider that includes IP-based content component 212 and modulated signal component 214.

Initially, assume that a user of television 246 requests, from media server 240, to view a particular channel (arrow "1", "request channel"). In this implementation, media server 240 may initially obtain the channel from modulated signal component 214 (arrow "2", "receive the channel as a modulated television signal"). Media server 240 may provide the channel to television 246 for display (arrow "3", "provide channel (received as modulated television signal) as an HDMI-compatible signal").

At some point, assume that media server 240 is scheduled to record a second television program. However, media server 240 does not have any free tuners to record the second television program. In order to free up a tuner to record the second television program, media server 240 may attempt to switch the particular channel to receiving the particular channel as a packet-based video stream (arrow "4", "in response to scheduled video recording, determine to switch to packet-based video stream"). Media server 240 may determine that the particular channel is available as a packet-based video stream (arrow "5", "channel available as packet-based video stream"). Media server 240 may then proceed to obtain the particular television channel from IP-based content component 212 as an HLS stream (arrow "6", "receive channel as an HLS stream"). Media server 240 may provide the channel to television 246 for display (arrow "7", "provide channel (received as HLS stream) as an HDMI-compatible signal").

In the example of FIG. 8, a television channel was switched, from being provided as a modulated television signal to a packet-based video stream, to enable an additional tuner to be made available.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5-7, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a device, a television channel as part of a modulated television signal;
   extracting, by a tuner associated with the device, the television channel from the modulated television signal;
   providing, by the device, the extracted television channel to a display device;
   determining, by the device, when a threshold period of time elapses without a user performing an action that causes pausing or rewinding of the extracted television signal, the threshold period of time corresponding to a period of time in which the television channel is being provided to the display device as an active television channel, and
      wherein the determined action is based on a determination of whether a content buffer, of the device, is read, to cause pausing or rewinding of the extracted television signal;
   determining, by the device and based on the determination that the threshold period of time has elapsed, to switch reception of the television channel from the modulated television signal to a packet-based video stream corresponding to the television channel;
   receiving, by the device and based on the determination to switch reception of the television channel to the packet-based video stream, the packet-based video stream;
   providing, by the device, the television channel, as received via the packet-based video stream, to the display device in place of the television channel received via the modulated television signal;
   determining a quality of the television channel as received via the packet-based video stream; and
   switching reception of the television channel back to the modulated television signal based on the determined quality of the television channel being below a threshold level.

2. The method of claim 1, wherein determining to switch reception further includes:
   determining to switch reception to the packet-based video stream corresponding to the television channel to free the tuner to extract a different television channel from the modulated television signal.

3. The method of claim 1, further comprising:
   causing the tuner to consume less power, in response to providing a television channel, as received via the packet-based video stream, to the display device, relative to when the tuner is being used to extract the television channel from the modulated television signal.

4. The method of claim 1, further comprising:
   buffering the television channel, in a buffer associated with the device, when the television channel is received via the modulated television signal.

5. The method of claim 1, wherein receiving the packet-based video stream includes receiving the packet-based video stream as hyper-text transfer protocol (HTTP) live streaming (HLS) content.

6. The method of claim 1, wherein the tuner includes a quadrature amplitude modulation (QAM) tuner.

7. A device, comprising:
a tuner;
a non-transitory memory device storing a set of computer-executable instructions; and
one or more processors configured to execute the computer-executable instructions, wherein executing the computer-executable instructions causes the one or more processors to:
receive a television channel as part of a modulated television signal;
extract, by the tuner, the television channel from the modulated television signal;
provide the extracted television channel to a display device;
determine, by the device, when a threshold period of time elapses without a user performing an action that causes pausing or rewinding of the extracted television signal, the threshold period of time corresponding to a period of time in which the television channel is being provided to the display device as an active television channel, and
wherein the determined action is based on a determination of whether a content buffer, of the device, is read, to cause pausing or rewinding of the extracted television signal;
determine, based on the determination that the threshold period of time has elapsed, to switch reception of the television channel from the modulated television signal to a packet-based video stream corresponding to the television channel;
receive, based on the determination to switch reception of the television channel to the packet-based video stream, the packet-based video stream;
provide the television channel, as received via the packet-based video stream, to the display device in place of the television channel received via the modulated television signal;
determine a quality of the television channel as received via the packet-based video stream; and
switch reception of the television channel back to the modulated television signal based on the determined quality of the television channel being below a threshold level.

8. The device of claim 7, wherein the device includes a set-top box or a media server.

9. The device of claim 7, wherein, when determining to switch reception, the one or more processors are further configured to execute the computer-executable instructions to:
determine to switch reception to the packet-based video stream corresponding to the television channel to free the tuner to extract a different television channel from the modulated television signal.

10. The device of claim 7, wherein the one or more processors are further configured to execute the computer-executable instructions to:
cause the tuner to consume less power, in response to providing a television channel, as received via the packet-based video stream, to the display device, relative to when the tuner is being used to extract the television channel from the modulated television signal.

11. The device of claim 7, further comprising:
a buffer, wherein the one or more processors are further configured to execute the computer-executable instructions to:
store the television channel, in the buffer, when the television channel is received via the modulated television signal.

12. The device of claim 7, wherein receiving the packet-based video stream includes receiving the packet-based video stream as hyper-text transfer protocol (HTTP) live streaming (HLS) content.

13. The device of claim 7, wherein the tuner includes a quadrature amplitude modulation (QAM) tuner.

14. A set-top box (STB) comprising:
a tuner; and
logic to:
extract, by the tuner, a television channel from a modulated television signal;
output the extracted television channel;
determine when a threshold period of time elapses without receiving a pause or rewind operation for the television channel;
determine, based on the determination that the threshold period of time has elapsed, to switch reception of the television channel from the modulated television signal to a packet-based video stream corresponding to the television channel, the threshold period of time corresponding to a period of time in which the television channel is being provided to the display device as an active television channel, and
wherein the determined action is based on a determination of whether a content buffer, of the STB, is read, to cause pausing or rewinding of the extracted television signal;
receive, based on the determination to switch reception of the television channel to the packet-based video stream, the packet-based video stream;
output the television channel, as received via the packet-based video stream, in place of the television channel extracted from the modulated television signal;
determine a quality of the television channel as received via the packet-based video stream; and
switch reception of the television channel back to the modulated television signal based on the determined quality of the television channel being below a threshold level.

15. The STB of claim 14, wherein the logic is further to:
store the television channel, in the buffer, when the television channel is received via the modulated television signal.

* * * * *